No. 645,734. Patented Mar. 20, 1900.
G. A. LOWRY.
BALE DETACHING AND STAYING DEVICE FOR PRESSES.
(Application filed Nov. 11, 1899.)
(No Model.) 4 Sheets—Sheet 2.

Witnesses.
Wm. M. Rheem
E. C. Semple

Inventor
George A. Lowry.
by Mason & Darby attys

No. 645,734. Patented Mar. 20, 1900.
G. A. LOWRY.
BALE DETACHING AND STAYING DEVICE FOR PRESSES.
(Application filed Nov. 11, 1899.)
(No Model.) 4 Sheets—Sheet 3.
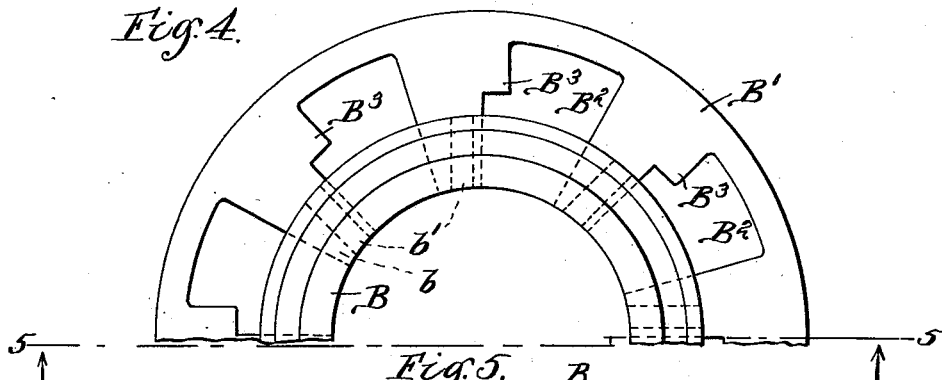
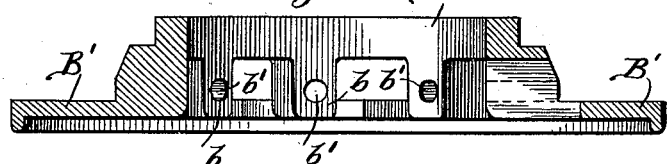
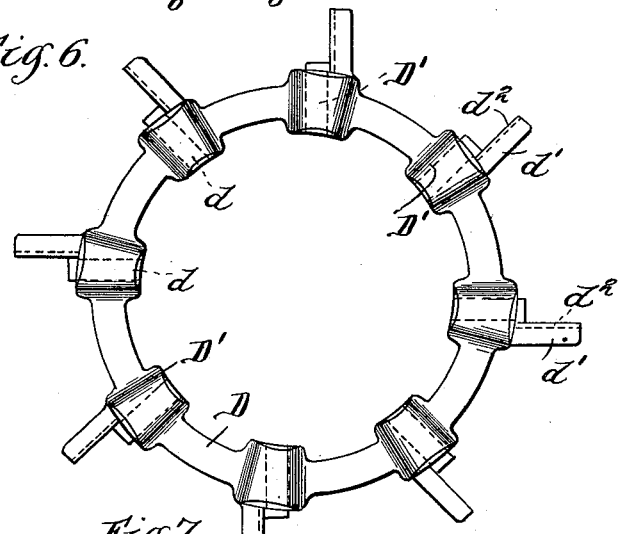
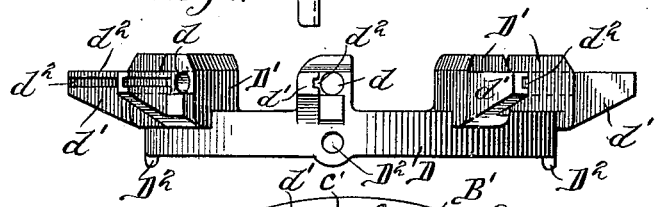
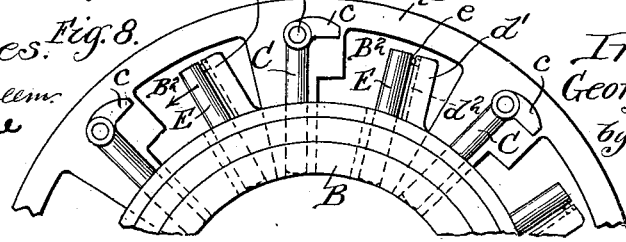
Witnesses.
W. M. Rheem.
E. C. Semple
Inventor
George A. Lowry
by Brown & Darby
att'ys No. 645,734. Patented Mar. 20, 1900.
G. A. LOWRY.
BALE DETACHING AND STAYING DEVICE FOR PRESSES.
(Application filed Nov. 11, 1899.)

(No Model.) 4 Sheets—Sheet 4.

Witnesses.
Wm. M. Rheem.
E. C. Semple.

Inventor
George A. Lowry.
By Brown & Darby
att'ys.

UNITED STATES PATENT OFFICE.

GEORGE A. LOWRY, OF CHICAGO, ILLINOIS, ASSIGNOR TO THE PLANTERS COMPRESS COMPANY, OF WEST VIRGINIA.

BALE DETACHING AND STAYING DEVICE FOR PRESSES.

SPECIFICATION forming part of Letters Patent No. 645,734, dated March 20, 1900.

Application filed November 11, 1899. Serial No. 736,577. (No model.)

*To all whom it may concern:*

Be it known that I, GEORGE A. LOWRY, a citizen of the United States, residing at Chicago, in the county of Cook and State of Illinois, have invented a new and useful Bale Detaching and Staying Device for Presses, of which the following is a specification.

This invention relates to bale detaching and staying devices for presses.

The object of the invention is to provide means of simple construction and arrangement and which are efficient in operation for separating a length from a compressed column of material formed in or by a press sufficient to make a bale and to stay such detached bale, as well as the end of the column from which the bale is detached, to prevent the undue expansion thereof.

Other objects of the invention will appear more fully hereinafter.

The invention consists, substantially, in the construction, combination, location, and arrangement, all as will be more fully hereinafter set forth, as shown in the accompanying drawings, and finally pointed out in the appended claims.

Figure 1:
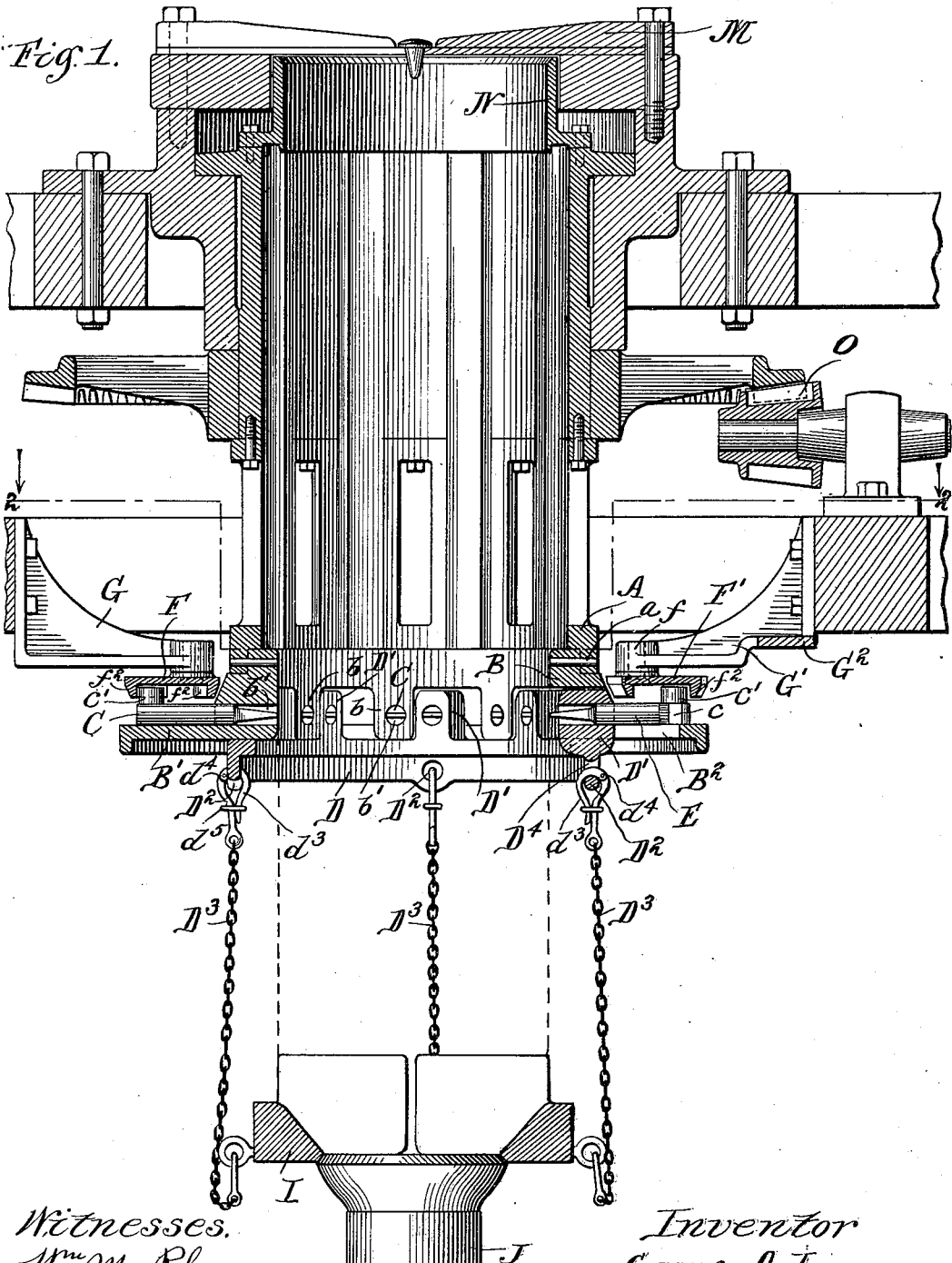
Figure 2:
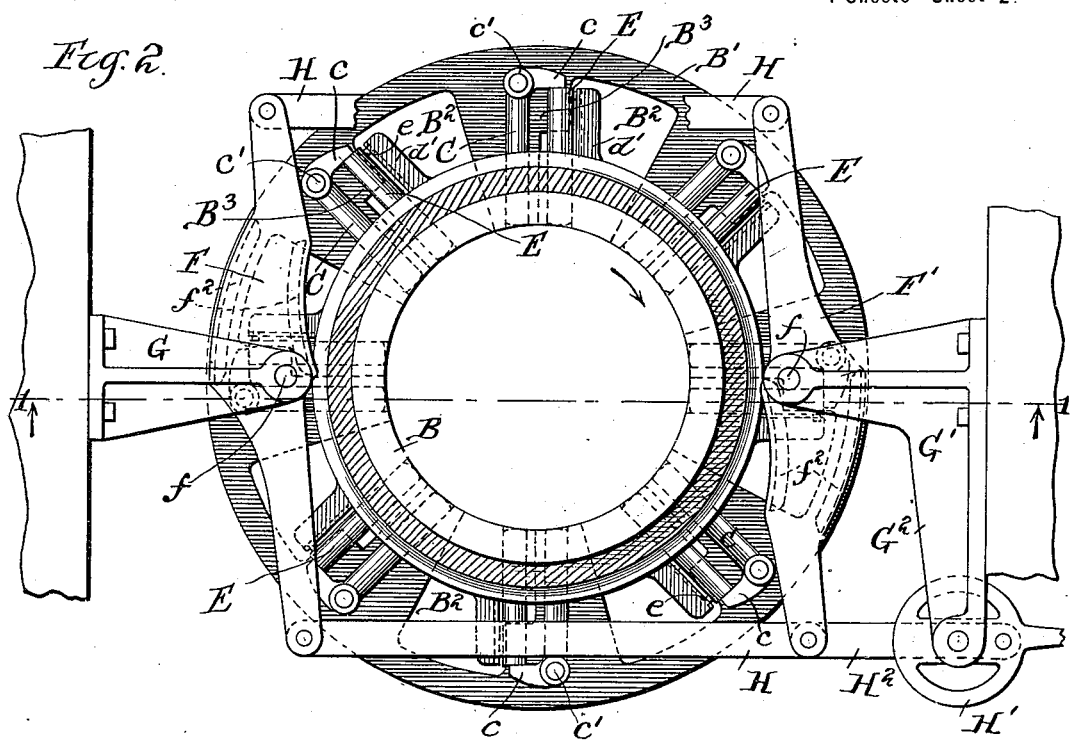
Figure 3:
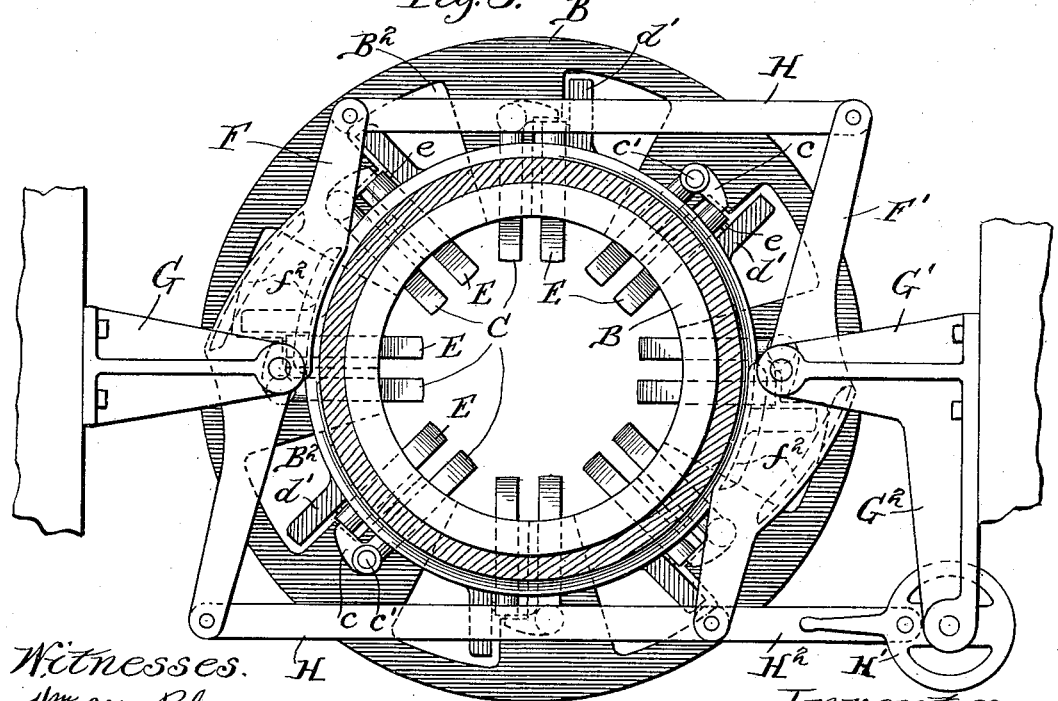
Figure 9:
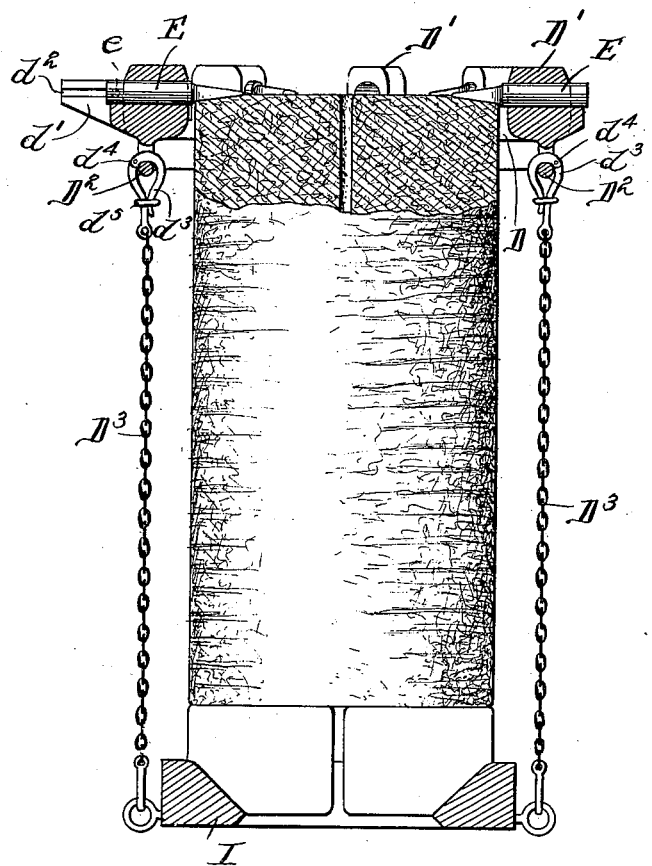

Referring to the accompanying drawings and to the various views and reference-signs appearing thereon, Figure 1 is a view in longitudinal central section of a form of press, parts being broken off, showing the application thereto of a construction embodying the principles of my invention. Fig. 2 is a transverse section on the line 2 2, Fig. 1, looking in the direction of the arrows, the bale detaching and staying devices being in retracted position. Fig. 3 is a view similar to Fig. 2, showing the bale detaching and staying devices in advanced or projected position. Fig. 4 is a broken detail view in plan of the carrier-ring for the bale-detaching and column supporting or staying devices. Fig. 5 is a section of the same on the line 5 5, Fig. 4, looking in the direction of the arrows. Fig. 6 is a detached detail view in plan of the stay-ring upon which are supported the bale-staying devices. Fig. 7 is a view in side elevation of the same. Fig. 8 is a broken detail view in plan of the carrier and stay-rings in assembled relation ready to be turned into position to be locked together. Fig. 9 is a view in side elevation, parts in longitudinal section, of a detached bale, showing the application thereto of the staying devices embodying the principles of my invention.

In the accompanying drawings I have shown the invention forming the subject-matter of the present application as applied to a press of the type shown, described, and claimed in my patents Nos. 581,600 and 581,601, dated April 27, 1897, and No. 630,369, dated August 8, 1899, and in some of its specific details the present invention involves certain improvements which are generically shown, described, and claimed in my pending applications, Serial No. 725,279, filed July 27, 1899, and Serial No. 733,174, filed October 10, 1899. A press of the type disclosed in said patents and applications and as illustrated in the accompanying drawings embodies in its general construction a slotted cap or head M and a compression chamber or holder N, these parts being mounted for relative movement. For instance, and in the particular form shown, the cap or head is stationary and the chamber or holder is revolved through suitable gearing O. In the operation of a press embodying these general features the material is fed or otherwise suitably delivered to or adjacent to the slot or slots in the head or cap and is caught or engaged by the mass of material previously introduced into the chamber or holder and is thereby drawn into such chamber in the form of thin compressed layers or sheets from which the air has been excluded and superposed upon the mass in the chamber or holder in spiral layers, thus building up the mass in the chamber endwise, each increment thus added correspondingly advancing the mass through the chamber or holder in the form of a highly condensed or compressed column. The present invention has particular reference to means for detaching a portion from such compressed column or mass of sufficient length to form a bale and for staying such detached bale and the end of the column from which it is detached to prevent the endwise expansion thereof.

In carrying out my invention I suitably mount adjacent to the point where a bale is to be detached a carrier-ring B—as, for instance, by securing such ring to a convenient part of the press, such as the lagging sleeve A. This ring is provided with a peripheral flange B', through which are formed a series of passages or openings B². Carrier-ring B is also provided with a series of lugs or projections $b$, through which are formed openings or passages $b'$, adapted to receive the detaching and staying devices C, which may be projected freely through said openings or passages $b'$. Associated in operation with the carrier-ring B is a somewhat-similar ring or support D, which is provided with a series of projections or lugs D', corresponding in number with and oppositely presented with respect to the lugs or projections $b$ of ring B, so that when said rings are assembled in coöperative relation the lugs or projections on the one ring will alternate with those of the other ring, the lugs or projections D' projecting through the openings B² in flange B'. The lugs or projections D' are provided with openings or passages $d$ therethrough, in which are arranged to freely slide the staying devices E. Lugs D' are provided with projecting arms $d'$, in which are formed grooves $d^2$, adapted to receive pins or lugs $e$, formed on or carried by the staying devices E, whereby said devices are guided and held against axial rotation during the operation thereof.

I have referred to the devices C and E as "detaching" and "staying" devices, and said devices may be of any suitable form adapted to perform the function of detaching a bale from the column of compressed material or of staying the detached bale or the end of the column from which the bale is detached to prevent endwise expansion thereof, or said devices may serve both functions of detaching and staying. In the drawings I have shown these devices in the form of blocks or rods having reduced or flattened ends whereby the penetration thereof into the mass of compressed material, or, more correctly, between the compressed layers composing said column, is facilitated.

The flange B' of carrier-ring B is provided with an offset or ledge B³, adjacent to one edge of each opening or passage B² and which projects into said opening or passage, thereby forming a shelf or rest. Now when the rings B and D are assembled together, as shown in Fig. 8, with the lugs or projections D' projecting or extending through the openings B², by giving the ring or support D a slight turn or rotation in the direction of the arrow (see Fig. 8) the outer ends of the devices E when said devices are in their retracted or withdrawn position will engage over and rest upon the offsets or ledges B³, thereby locking the rings B and D together. (See Fig. 2.) Now when the devices E are projected, as will be presently more fully explained and as shown in Fig. 3, the ends thereof are moved clear of the offsets or ledges B³, thereby effecting the disengagement of said rings from each other.

Each of the devices C is provided with a heel projection or lug $c$, forming a lateral extension which extends into position to engage the end of its adjacent and coöperating device E, whereby when said devices C are projected endwise the devices E are also engaged and projected at the same time, leaving said devices E free when projected to an extent sufficient to clear the ledges or shelves B³ to be detached from the engagement of said lugs or lateral projections $c$. The devices C are also each provided with a roller or projection $c'$, by which the said devices may be advanced or retracted.

I have shown a simple and efficient construction for securing the desired movements of the devices C and E and wherein I employ the levers F F', suitably pivoted intermediate their ends, as at $f$, upon brackets G G' or other suitable or convenient part of the machine-frame. The levers F F' are connected together at their ends by means of links H. The levers F F' may be rocked in any suitable or convenient manner. As illustrative of one form of means for accomplishing this result I connect one end of one of the levers, as F', by means of a link H², to an operating wheel or lever H', suitably pivoted upon an arm or extension G² of bracket G' or other suitable or convenient part of the frame. By rocking the operating wheel or handle H' the levers F F' through links H² and H will be rocked, as clearly shown in Figs. 2 and 3. The levers F F' are each provided with the flanges or projections $f^2$, arranged when said levers are rocked in one direction or the other to engage the projections $c'$ on devices C and advance or withdraw them, as may be desired, the advance of said devices also effecting the advance of devices E through the engagement therewith of the lugs or projections $c$. This result is secured by reason of the fact that the flanges $f^2$ present their engaging surfaces in the path of the projections during the operation of the machine, it being understood that the machine is in operation when the detaching or staying devices are operated.

The stay-ring D is provided with one or more eyes D², to which are secured the bale-stays D³, which, as shown, are in the form of flexible chains, as by means of hooks $d^3$. This connection may be detachable, as by hinging the hooks $d^3$ at $d^4$, said hook being clamped in securing position by means of a ring $d^5$. By sliding the ring $d^5$ off the end of the hook said hook may be readily released and detached from the eye D². At their other ends the stays D³ are suitably secured to the bale base or support I, as shown in Figs. 1 and 9. In the operation of the press this bale base or support rests upon the plunger or jack J.

The operation will be fully understood from the foregoing description and is as follows: The press is started up, and the compressed column, resting upon the bale-base I and jack J, advances, said jack receding until the limit of the stays D³ is reached—that is, in case chains or other flexible stays are employed until the slack therein is taken up. The wheel or lever H' is then operated to swing the levers F F' into the position shown in Fig. 3, thereby advancing the detaching and staying devices C and E, the latter being advanced far enough to clear the ledges or offsets B³, thereby detaching a bale and also detaching the stay-ring D from the carrier-ring B. The jack J, which carries the detached bale, is then moved back sufficiently for the ring D to be withdrawn from ring B, and the bale, which is held clamped endwise between the ring D or the devices E, carried thereby, and the bale base or support, is removed to receive its permanent stays. After the bale is tied the hooks $d^3$ are detached and the ring D is removed, thus releasing the bale and permitting its removal from the base I. It will be observed that the devices C remain in their advanced position, and hence serve to hold the end of the column against endwise expansion during the operation of removing the detached bale, or until the jack J is again advanced, another stay-ring D being in the meantime applied to the carrier-ring B in the manner above described. The detaching and staying devices C are then withdrawn by a suitable manipulation of lever H' and the compressing operation continued until it is desired to detach another bale, when the operation above described is repeated.

It is obvious that many variations and changes in the details of construction and arrangement would readily suggest themselves to persons skilled in the art and still fall within the spirit and scope of my invention. I do not desire, therefore, to be limited or restricted to the exact construction and arrangement shown and described; but, Having now set forth the object and nature of my invention and a form of construction embodying the principles thereof and having explained such construction, its purpose, function, and mode of operation, what I claim as new and useful and of my own invention, and desire to secure by Letters Patent, is—

1. In a press, compressing devices, a stay-ring, staying devices carried thereby, and adapted when in their retracted position to lock said ring to said compressing devices, means for advancing said staying devices to engage the end of the bale and to disengage said ring from said compressing devices, a bale-base, and connections between said bale-base and stay-ring, as and for the purpose set forth.

2. In a press, the combination with a relatively-moving cap or head and compression chamber or holder, of a stay-ring, staying devices carried thereby and adapted when in their retracted position to lock said ring to said compression-chamber, means for advancing said staying devices to engage the end of the bale and to free said ring from said chamber, a bale-base, and connections between said bale-base and ring, as and for the purpose set forth.

3. In a press, the combination with a slotted head or cap, a compressing-chamber and means for relatively rotating said chamber and cap, of a stay-ring, staying devices movably mounted thereon, and adapted when retracted to form a lock for locking said ring to said chamber, means for advancing said staying devices to detach said ring, a bale-base, and connections between said base and ring, as and for the purpose set forth.

4. In a press, a slotted head or cap, a compression-chamber, and means for relatively rotating these parts, in combination with a stay-ring, a bale-base, and flexible connections between said base and ring, as and for the purpose set forth.

5. In a press, the combination with compressing devices, of a stay-ring, a bale-base, and flexible connections between said base and stay-ring, as and for the purpose set forth.

6. In a press, the combination with compressing devices, and means for detaching a portion of the compressed material to form a bale, of a stay-ring for the detached bale, a bale-base, and flexible connections between said base and stay-ring, as and for the purpose set forth.

7. In a press, the combination with compressing devices, and means for detaching a portion of the compressed material to form a bale, of a stay-ring for the detached bale, a bale-base, and flexible devices connected at one end to said bale-base and detachably connected at the other end to said stay-ring, as and for the purpose set forth.

8. In a press, the combination with compressing devices and means for detaching a portion of the compressed material to form a bale, of a stay-ring, staying devices mounted therein and adapted to be projected to engage the detached bale, guides engaged by said staying devices, a bale-base, and connections between the bale-base and ring, as and for the purpose set forth.

9. In a press, the combination with compressing devices, of a stay-ring, staying devices carried thereby and adapted to be projected into the compressed mass, guides for said staying devices, a bale-base, and connections between said base and staying devices, as and for the purpose set forth.

10. In a press, the combination with compressing devices, of a stay-ring, projections formed thereon and having guideways, staying devices carried by said ring and arranged to be projected into the mass of compressed material, lugs formed on said staying devices and arranged to operate in said guideways, a bale-base, and connections between said base and ring, as and for the purpose set forth.

11. In a press, and in combination with compressing devices, a carrier-ring, detaching devices carried thereby and provided with lugs or projections, a stay-ring, staying devices carried thereby and abutting against said detaching devices, whereby when said detaching devices are projected into the mass of compressed material the staying devices are simultaneously advanced, but said detaching devices are free to be retracted without retracting said staying devices, means for actuating said detaching devices and means arranged to coact with said staying devices to grasp and hold the bale, as and for the purpose set forth.

12. In a press and in combination with compressing devices and means for detaching a portion of the compressed material, of sufficient length to form a bale, of a stay-ring adapted to be applied to the end of the detached portion, a bale-base, and connections between the bale-base and stay-ring, as and for the purpose set forth.

13. In a press, and in combination with compressing devices, and means for detaching a portion of the compressed material, of sufficient length to form a bale, of a stay-ring detachably locked to said compression devices, a bale base or support, connections between said support, and means for detaching said stay-ring from said compressing devices, as and for the purpose set forth.

14. In a press, the combination with compressing devices, a carrier-ring connected thereto, a stay-ring detachably connected to said carrier-ring, a bale-base, connections between said base and stay-ring, means for detaching a portion of the compressed material, of sufficient length to form a bale, and means for detaching said stay-ring from said carrier-ring, as and for the purpose set forth.

15. In a press for compressing fibrous material, the combination with a carrier-ring, of a stay-ring adapted to be detachably locked thereto, a bale-base, and means connecting said bale-base and stay-ring, as and for the purpose set forth.

16. In a press, the combination with a carrier-ring, and bale-detaching devices carried thereby, of a stay-ring adapted to be detachably locked to said carrier-ring, and carrying means for engaging the end of the detached bale to hold the same against endwise expansion, as and for the purpose set forth.

17. In a press, a carrier-ring, bale-detaching devices carried thereby, a stay-ring, bale-staying devices carried thereby, said staying devices, when in their retracted position, forming a lock for locking said rings together, means for projecting said staying and detaching devices, whereby a bale is detached and its end engaged and said rings unlocked, and means for retaining said staying devices in engagement with the end of the bale, as and for the purpose set forth.

18. In a press, a carrier-ring having a flange, a stay-ring, staying devices carried thereby and arranged, when in their retracted position, to engage said flange to lock said rings together, a bale-base, connections between said base and stay-ring, and means for advancing said staying devices, thereby detaching said rings from each other, as and for the purpose set forth.

19. In a press, a carrier-ring having a flange, a stay-ring having projections, staying devices mounted in said projections and, when in their retracted position, engaging said flange to lock said rings together, means for advancing said staying devices to clear said flange and to engage the end of the bale and means coacting with said staying devices for confining the bale therebetween, as and for the purpose set forth.

20. In a press, a carrier-ring having a flange, said flange provided with openings therethrough, a stay-ring having projections or lugs arranged to project into or through said openings, staying devices carried by said lugs or projections and arranged when retracted to engage said flange to lock said rings together, and means for advancing said staying devices to engage the end of the bale and to disengage said flange and means coacting with said staying devices for confining the bale therebetween, as and for the purpose set forth.

21. In a press, a carrier-ring provided with a flange having passages or openings therethrough, a stay-ring having lugs or projections arranged to extend through said openings or passages, staying devices carried by said lugs or projections, and arranged when retracted to engage said flange to lock said rings together, means for advancing said staying devices to engage the end of the bale and to disengage said flange, a bale-base, and means for connecting said bale-base and stay-ring, as and for the purpose set forth.

22. In a press, a carrier-ring provided with a flange having passages or openings therethrough, detaching devices carried by said ring, a stay-ring having lugs or projections arranged to project through said openings or passages, and carrying staying devices, said staying devices arranged when retracted to engage said flange to lock said rings together, said detaching devices arranged to engage said staying devices to advance the latter, and means for advancing the detaching devices and means coacting with said staying devices for confining the bale, as and for the purpose set forth.

23. In a press, a carrier-ring, a stay-ring carrying staying devices, and adapted to be detachably locked to said carrier-ring, guides formed in said stay-ring, projections formed on said staying devices to engage said guides, and means for advancing said staying devices and unlocking said rings and means coacting with said staying devices for confining the bale, as and for the purpose set forth.

24. In a press, a carrier-ring having openings or passages, a ledge or offset formed at one edge of each of said passages, a stay-ring having lugs or projections arranged, when said rings are assembled, to project through said openings or passages, movable staying devices carried by said lugs or projections, said staying devices adapted, when in their retracted position, to engage said offsets or ledges, whereby said rings are locked together, and means for advancing said staying devices to clear said ledges or offsets and means coacting with said staying devices for confining the bale, as and for the purpose set forth.

25. In a press, a carrier-ring having openings or passages, a ledge or offset formed at one edge of each of said openings or passages, a stay-ring having lugs or projections arranged, when said rings are assembled, to project through said openings or passages, movable staying devices carried by said lugs or projections, and adapted when in their retracted position to engage said offsets or projections to lock said rings together, and means for advancing said staying devices to engage the end of a bale and to clear said offsets or projections, in combination with a bale-base, and connections between said bale-base and stay-ring, as and for the purpose set forth.

26. In a press, the combination with compressing devices, of a carrier-ring connected thereto and having lugs or projections, a stay-ring having oppositely-presented lugs or projections arranged, when said rings are assembled, to alternate with the lugs or projections on said carrier-ring, bale detaching and staying devices carried by said lugs or projections, and means for actuating said detaching and staying devices and means coacting with said staying devices for confining the bale, as and for the purpose set forth.

27. In a press, compressing devices, a carrier-ring connected thereto, a stay-ring arranged to be detachably locked to said carrier-ring, and carrying staying devices, means for advancing said staying devices and simultaneously unlocking said rings from each other, a bale-base, and means for connecting said base and stay-ring, as and for the purpose set forth.

28. In a press, and in combination with compressing devices, a detaching device, a staying device arranged to be engaged thereby and advanced into the compressed material simultaneously with said detaching device, but detachable therefrom, said detaching device provided with a lug, a lever pivotally mounted, and provided with flanges to engage said lugs, whereby said detaching device is advanced or retracted, a bale-base, connections between said base and staying device, and means for actuating said lever, as and for the purpose set forth.

In witness whereof I have hereunto set my hand, this 7th day of November, 1899, in the presence of the subscribing witnesses.

GEORGE A. LOWRY.

Witnesses:
LOUISE CORNELL,
WM. M. RHEEM.